(No Model.)
C. F. JAMES & F. N. CARDER.
REEL FOR CHECK ROW WIRE.
No. 315,790. Patented Apr. 14, 1885.
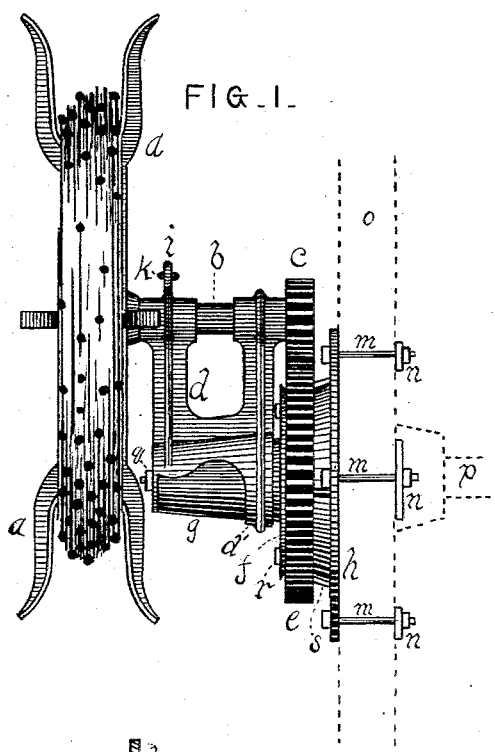
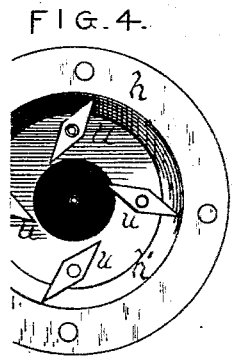
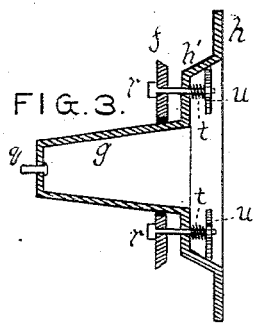
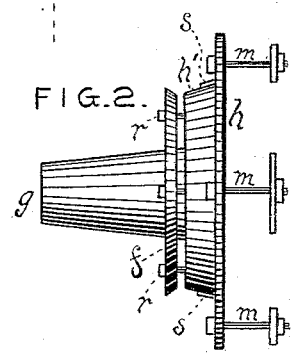
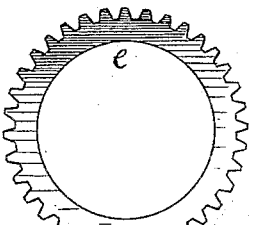
Witnesses.
W. I. Walker
J. H. Montgomery
Inventors.
Charles F. James.
Floyed N. Carder.
By L. P. Graham.
Atty.

United States Patent Office.

CHARLES F. JAMES, OF MAROA, AND FLOYED N. CARDER, OF LINCOLN, ILLINOIS.

REEL FOR CHECK-ROW WIRE.

SPECIFICATION forming part of Letters Patent No. 315,790, dated April 14, 1885.

Application filed January 22, 1885. (No model.)

*To all whom it may concern:*

Be it known that we, CHARLES F. JAMES, of Maroa, in the county of Macon and State of Illinois, and FLOYED N. CARDER, a resident of Lincoln, in the county of Logan and State of Illinois, have invented certain new and useful Improvements in Reels for Check-Row Wire, of which the following is a specification.

Our invention consists in certain details of construction and combinations of parts, as hereinafter set forth and claimed.

In the drawings accompanying and forming a part of this specification, Figure 1 is a side view of our device, and Figs. 2, 3, 4, and 5 represent the various parts in detail.

$a$ is a reel-frame for the wire, rigidly mounted on shaft $b$.

$c$ is a gear-pinion rigidly mounted on shaft $b$.

$d$ is a bearing for shaft $b$.

$e$ is a cogged circular band that meshes with pinion $c$.

$f$ is a bevel-edged friction-plate.

$g$ is a tubular shaft or hub.

$h$ is an annular band or rim.

$h'$ is a circular bearing for cogged band $e$.

$i$ is a lug on bearing $d$, and $k$ is a rod that extends backward and connects said bearing with the frame of the corn-planter.

$m$ $m$ $m$ are securing-bolts, and $n$ $n$ $n$ are clamps on the same.

$o$ indicates the position of the spokes of the planter-wheel.

$p$ represents the corn-planter axle.

$q$ is a securing-bolt in the end of shaft $g$.

$r$ are adjusting-bolts that pass through plate $f$ and the shoulder of hub or shaft $g$.

$t$ $t$ are springs on bolts $r$, and $u$ $u$ are elongated nuts for the same.

$s$ $s$ are raised projections on bearing $h'$.

Shaft $g$ fits over the hub of the planter-wheel, and is secured in position by means of clamps $n$ $n$ $n$ and securing-bolts $m$ $m$ $m$, the said clamps fitting against the inside of the spokes and the bolts passing between the same. Cogged band $e$ is made more or less rigid with the bearing $h$ by means of adjusting-bolts $m$ $m$ $m$ and bevel-edged plate $f$. The lower portion, $d'$, of bearing $d$ fits over shaft $g$, and is secured rotatingly thereon by means of bolt $q$. The bearing $d$ is held approximately vertical with shaft $g$ by means of a brace, $k$, that connects the same with the planter-frame. The springs $t$ assist in regulating the friction of cogged band $e$ on hub or bearing $h'$, and the form of nuts $u$ prevents their rotation while bolts $r$ are being adjusted.

In operation, when the wire is laid down, the cogged band is adjusted to rotate in an adverse direction to the planter-wheel and the bearing $h'$, but with sufficient friction to insure the proper stretching of the wire. When the wire is to be taken up, the tension is adjusted so tightly that the cogged band $e$ will rotate with the wheel of the planter under ordinary stress, but will slip on its bearing when the wire is reeled up faster than the planter advances. The bevel edge of plate $f$ causes the friction that regulates the tension of cogged band $e$, and projections $s$ $s$ hold said band in line with pinion $c$ while said tension is adjusted.

We claim as new and desire to secure by Letters Patent—

1. The combination, in a reel for check-row wire, of tubular hub $g$, adapted to fit over the outer extremity of the hub of a planter-wheel and be securely attached to said wheel, a friction-plate having lateral motion on said hub $g$ and partaking of its rotary motion, a cogged band, $e$, adapted to lie loosely on hub $g$ or partake of the motion of the same, according as the tension-plate is tightened or loosened, and a pinion, $c$, rigid on a reel-shaft and arranged to mesh with the cogged band, substantially as and for the purpose set forth.

2. The combination of hub $g$, bearing $h'$, suitable means for securing the same to the wheel of a planter, friction-plate $f$, and suitable means for adjusting the same laterally with reference to bearing $h'$, a cogged band, $e$, on bearing $h'$, subject to the tension of plate $f$, and a pinion, $c$, on a reel-shaft in mesh with the cogged band, substantially as and for the purpose set forth.

3. The combination, with hub $g$ and adjustable band e, of bearing d d', loosely mounted on hub g and braced from the planter-frame, shaft b, pinion c, and reel a, as and for the purpose set forth.

4. The combination of bearing h', projections s, cogged band e, friction-plate f, bolts r, springs t, and nuts u, for the purpose of transmitting power from a planter-wheel to a check-row-wire reel, as set forth.

CHARLES F. JAMES.
FLOYED N. CARDER.

Witnesses:
C. C. CLARK,
L. P. GRAHAM.